US00RE50022E

(19) United States
(12) Reissued Patent
Shin et al.

(10) Patent Number: US RE50,022 E
(45) Date of Reissued Patent: Jun. 25, 2024

(54) ROTARY COMPRESSOR WITH SPECIFIC SUCTION GEOMETRY

(71) Applicant: LG Electronics Inc., Seoul (KR)

(72) Inventors: Jinung Shin, Seoul (KR); Seokhwan Moon, Seoul (KR); Kiyoul Noh, Seoul (KR)

(73) Assignee: LG Electronics Inc., Seoul (KR)

(21) Appl. No.: 17/720,972

(22) Filed: Apr. 14, 2022

Related U.S. Patent Documents

Reissue of:
(64) Patent No.: 10,954,945
Issued: Mar. 23, 2021
Appl. No.: 15/986,114
Filed: May 22, 2018

(30) Foreign Application Priority Data

May 26, 2017 (KR) ..... 10-2017-0065454

(51) Int. Cl.
*F04C 18/344* (2006.01)
*F04C 29/00* (2006.01)

(52) U.S. Cl.
CPC ..... *F04C 18/344* (2013.01); *F04C 18/3441* (2013.01); *F04C 18/3442* (2013.01); *F04C 29/005* (2013.01)

(58) Field of Classification Search
CPC ..... F04C 18/344; F04C 18/3441; F04C 18/3442; F04C 29/005
See application file for complete search history.

(56) References Cited

U.S. PATENT DOCUMENTS 3,744,942 A * 7/1973 Mount ..... F04C 18/3442 418/94
4,619,595 A * 10/1986 Amano ..... F04C 18/00
4,702,684 A * 10/1987 Takao ..... F04C 18/344
(Continued)

FOREIGN PATENT DOCUMENTS

EP 2520803 11/2012
EP 2784325 10/2014
(Continued)

OTHER PUBLICATIONS

Notice of Allowance in Korean Appln. No. 10-2021-0162701, dated Jul. 26, 2022, 8 pages (with English translation).
(Continued)

*Primary Examiner* — Russell D Stormer
(74) *Attorney, Agent, or Firm* — Fish & Richardson P.C.

(57) ABSTRACT

A rotary compressor includes a cylinder that is coupled to an inner space of a casing and that defines a compression space, a first bearing and a second bearing located at upper and lower sides of the cylinder, a roller disposed eccentrically with respect to an inner circumferential surface of the cylinder to vary a volume of the compression space based on rotation, and a vane inserted into the roller to rotate together with the roller, and drawn out toward the inner circumferential surface of the cylinder during the rotation of the roller to partition the compression space into a plurality of compression chambers. A suction passage communicating with the compression space is defined in the first bearing or the second bearing, and a suction port communicating between the suction passage and the compression space is defined on a side surface of the cylinder.

14 Claims, 10 Drawing Sheets

Amended

(56) References Cited

U.S. PATENT DOCUMENTS

| | | | | |
|---|---|---|---|---|
| 2013/0101412 | A1* | 4/2013 | Mitsuhashi | F04D 19/00 415/220 |
| 2014/0069139 | A1 | 3/2014 | Perevozchikov et al. | |
| 2016/0153452 | A1 | 6/2016 | Nagano et al. | |
| 2016/0241092 | A1* | 8/2016 | Nigo | F04C 18/344 |
| 2018/0187680 | A1* | 7/2018 | Moon | F04C 18/3441 |

FOREIGN PATENT DOCUMENTS

| | | | |
|---|---|---|---|
| KR | 20000001097 | | 1/2000 |
| KR | 20060048898 | A | 5/2006 |
| KR | 1020060048898 | | 5/2006 |

OTHER PUBLICATIONS

European Search Report in European Appln. No. 18174035.8, dated Oct. 5, 2018, 8 pages.

* cited by examiner

Amended

ROTARY COMPRESSOR WITH SPECIFIC SUCTION GEOMETRY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[The present disclosure relates to subject matter contained in] *This application is a reissue application of U.S. application Ser. No. 15/986,114, filed on May 22, 2018, now U.S. Pat. No. 10,954,945, issued on Mar. 23, 2021, which claims* priority *to* Korean Application No. 10-2017-0065454, filed on May 26, 2017, *the disclosure of* which are herein expressly incorporated by reference in their entirety.

BACKGROUND

1. Field

The present disclosure relates to a rotary compressor, and more particularly, to a low-pressure vane rotary compressor.

2. Description of the Related Art

A typical rotary compressor is a compressor in which a roller and a vane are in contact with each other to divide a compression space in a cylinder into a suction chamber and a discharge chamber around the vane. In such a typical rotary compressor, the vane performs a linear motion while the roller performs an orbiting motion, and thus the suction chamber and the discharge chamber form a compression chamber having a variable volume (capacity) to suck, compress and discharge refrigerant.

Furthermore, contrary to the typical rotary compressor, a vane rotary compressor is also known in which a vane is inserted into a roller and rotated together with the roller to form a compression chamber while being drawn out by a centrifugal force and a back pressure.

A vane rotary compressor is known as a high-pressure vane rotary compressor in which an inner space of a casing forms a discharge pressure similarly to a typical rotary compressor, as well as a low-pressure vane rotary compressor in which an inner space of a casing forms a suction pressure.

In the former case, as a suction pipe directly communicates with the compression chamber, there is a restriction that a separate accumulator must be provided on an outside or inside of the casing. On the contrary, in the latter case, since an inner space of the casing is used as a type of accumulating space, it is not necessary to provide a separate accumulator, thereby increasing the material cost and space utilization.

In addition, the vane rotary compressor may be divided into a longitudinal type or a transverse type depending on the installation type similarly to a typical rotary compressor. The longitudinal type is a form in which a drive motor and a compression unit constituting an electric motor unit are arranged in a direction orthogonal to the ground, and the transverse type is a form in which the drive motor and the compression unit are arranged in parallel or inclined to the ground.

Moreover, the vane rotary compressor may be classified into a closed type or an open type depending on whether the drive motor and the compression unit are provided in a casing similarly to a typical rotary compressor. In the closed type, the drive motor and the compression unit are installed together in one casing, and in the open type, the drive motor and the compression unit are independently installed therein, respectively.

"Capacitive Variable Gas Compressor (Korean Patent Publication No. 10-2006-0048898)" published on May 18, 2006, discloses an example of a low-pressure open type vane rotary compressor (hereinafter, abbreviated as a vane rotary compressor).

However, in a vane rotary compressor in the related art as described above, the suction port is formed in a front side block corresponding to one side surface in an axial direction of the compression chamber, there was a limitation that an area of the suction port is restricted. In other words, the suction port of the vane rotary compressor should be formed near a point where the rotor and the cylinder are in contact with each other, and the point where the rotor and the cylinder are in contact with each other is located at a position where a gap between the rotor and the cylinder is the smallest, and thus an area of the suction port should be very small. It may cause a problem that the suction loss is increased as a flow resistance is increased with respect to refrigerant being sucked into the suction port, thereby reducing the performance of the compressor. In particular, since the suction area is restrictive during high-speed operation, there is a limitation in applying to a large-capacity model.

Furthermore, in the case of the prior art described above, in case of a high-pressure type in which an inner space of the casing forms a discharge pressure, or a low-pressure type in which the inner space of the casing forms a suction pressure, refrigerant being sucked into the inner space of the casing may flow in the inner space of the casing without being directly sucked into the suction port to cause a type of flow loss, thereby further increasing suction loss.

Besides, in case of the related art described above, as the suction port is formed in a regular shape and the suction port is formed away from the suction start point, the suction start time is delayed, and due to this, the compression performance due to the suction loss may be deteriorated. In consideration of this, when the suction completion point is shifted backward with respect to the compression advancing direction, the compression duration may be shortened, thereby causing compression loss while generating overcompression.

SUMMARY

An object of the present disclosure is to provide a rotary compressor capable of securing an increased area of the suction port to prevent suction loss, thereby improving the performance of the compressor.

Furthermore, another object of the present disclosure is to provide a rotary compressor capable of minimizing a flow loss of refrigerant being sucked into the compression chamber in a low-pressure type in which the inner space of the casing forms a suction pressure.

In addition, still another object of the present disclosure is to provide a rotary compressor capable of securing a suction area at the suction start point to prevent the suction start point from being delayed while at the same time preventing the suction completion time from being shifted backward, thereby preventing the compression duration from being shortened.

In order to accomplish the objectives of the present disclosure, there is provided a rotary compressor, including a cylinder configured to form a compression space, a plurality of bearings provided on both upper and lower sides of the cylinder; a roller provided in the compression space to rotate; and at least one vane configured to separate the compression space into a suction chamber and a discharge chamber together with the roller, wherein a suction passage is formed in any one of the bearings, and a suction port communicating with the suction passage is passed through an inner circumferential surface of the cylinder.

Here, an inlet of the suction passage may be provided to face an end portion of a suction guide pipe connected to a suction pipe.

Furthermore, in order to accomplish the foregoing objectives, there is provided a rotary compressor, including a casing in which a suction pipe communicates with an inner space thereof; a cylinder fixedly coupled to an inner space of the casing, and provided with an inner circumferential surface forming a compression space; a first bearing and a second bearing provided on both upper and lower sides of the cylinder to form a compression space together with the cylinder; a roller provided eccentrically with respect to an inner circumferential surface of the cylinder to vary a volume of the compression space while rotating; and a vane inserted into the roller to rotate together with the roller, and drawn out toward the inner circumferential surface of the cylinder during the rotation of the roller to partition the compression space into a plurality of compression chambers, wherein a suction passage communicating with the compression space is formed in the first bearing or the second bearing, and a suction port communicating between the suction passage and the compression space is formed on a side surface of the cylinder.

Here, a radial width of the suction passage may be formed to be larger than a maximum gap between an inner circumferential surface of the cylinder and an outer circumferential surface of the roller.

Furthermore, the suction port may be formed through an inside of the cylinder or formed by chamfering an inner circumferential edge of the cylinder.

Furthermore, the suction passage may be formed to be located out of a range of the compression space in a planar projection.

Furthermore, a part of the suction passage may be formed to be located within a range of the compression space in a planar projection.

Furthermore, a suction guide pipe may be provided between the suction passage and the suction pipe.

Furthermore, one end of the suction guide pipe may be connected to the suction pipe and the other end thereof may be provided to receive the suction passage.

Furthermore, an electric motor unit including a stator and a rotor may be further provided in an inner space of the casing, wherein the suction pipe communicates through a space provided with the cylinder with respect to the electric motor unit.

Furthermore, a suction connection pipe may be coupled between the suction passage and the suction pipe.

Furthermore, an electric motor unit including a stator and a rotor may be further provided in an inner space of the casing, wherein the suction pipe communicates through a space opposite to a space provided with the cylinder with respect to the electric motor unit.

Furthermore, an electric motor unit including a stator and a rotor may be further provided at an outside of the casing, wherein the electric motor unit is coupled to the roller and mechanically connected to a rotation shaft passing through the casing.

Here, a suction connection pipe may be coupled between the suction passage and the suction pipe. Furthermore, the suction portion may include a main suction portion; and a sub-suction portion extended in a suction start direction from the main suction portion.

Furthermore, a radial width of the sub-suction portion may be formed to be smaller than that of the main passage portion, and a circumferential length of the sub-suction portion may be formed to be larger than a radial width thereof.

In addition, in order to accomplish the foregoing objectives, there is provided a rotary compressor, including a cylinder configured to form a compression space and form a suction port to communicate with the compression space; a roller provided in the compression space to rotate; at least one vane configured to divide the compression space into a suction chamber and a discharge chamber together with the roller; and a plurality of bearings provided on both upper and lower sides of the cylinder to form the compression space together with the cylinder, and provided with a suction passage communicating with the suction port on either one side thereof, wherein the suction passage includes a main passage portion; and a sub-passage portion extended in a suction start direction from the main passage portion.

Here, a radial width of the sub-passage portion may be formed to be smaller than that of the main passage portion, and a circumferential length of the sub-passage portion may be formed to be larger than a radial width thereof.

In the vane rotary compressor according to the present disclosure, as the suction pipe is connected to the casing and the suction passage is formed in the main bearing, an increased area of the suction port may be secured to prevent suction loss in advance, thereby improving the performance of the compressor.

Furthermore, in case of a low-pressure type in which the inner space of the casing forms a suction pressure, a suction guide pipe may be connected between the suction pipe and the suction passage to minimize a flow loss of refrigerant being sucked into the compression chamber, thereby improving the compressor performance.

In addition, as the suction passage or the suction port is extended in the direction of the suction start point, a suction area at the suction start point may be secured to prevent the suction start point from being delayed while at the same time preventing the suction completion point from being shifted backward, preventing the compression duration from being shortened.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Hereinafter, a rotary compressor according to the present disclosure will be described in detail with reference to an embodiment illustrated in the accompanying drawings. For reference, the present disclosure is applied to a type of low-pressure vane rotary compressor in which the inner space of the casing forms a suction pressure, and may be applicable to both longitudinal and transverse types. Furthermore, the present disclosure may be applicable to both a closed type in which an electric motor unit and a compression unit are provided together inside the casing, and an open type in which the electric motor unit is provided outside the casing. However, in the present embodiment, a transverse open type vane rotary compressor is taken as a representative example for the sake of convenience. In addition, a representative example of a vane rotary compressor will be described and then another type of vane rotary compressor will be additionally described.

Figure 1:
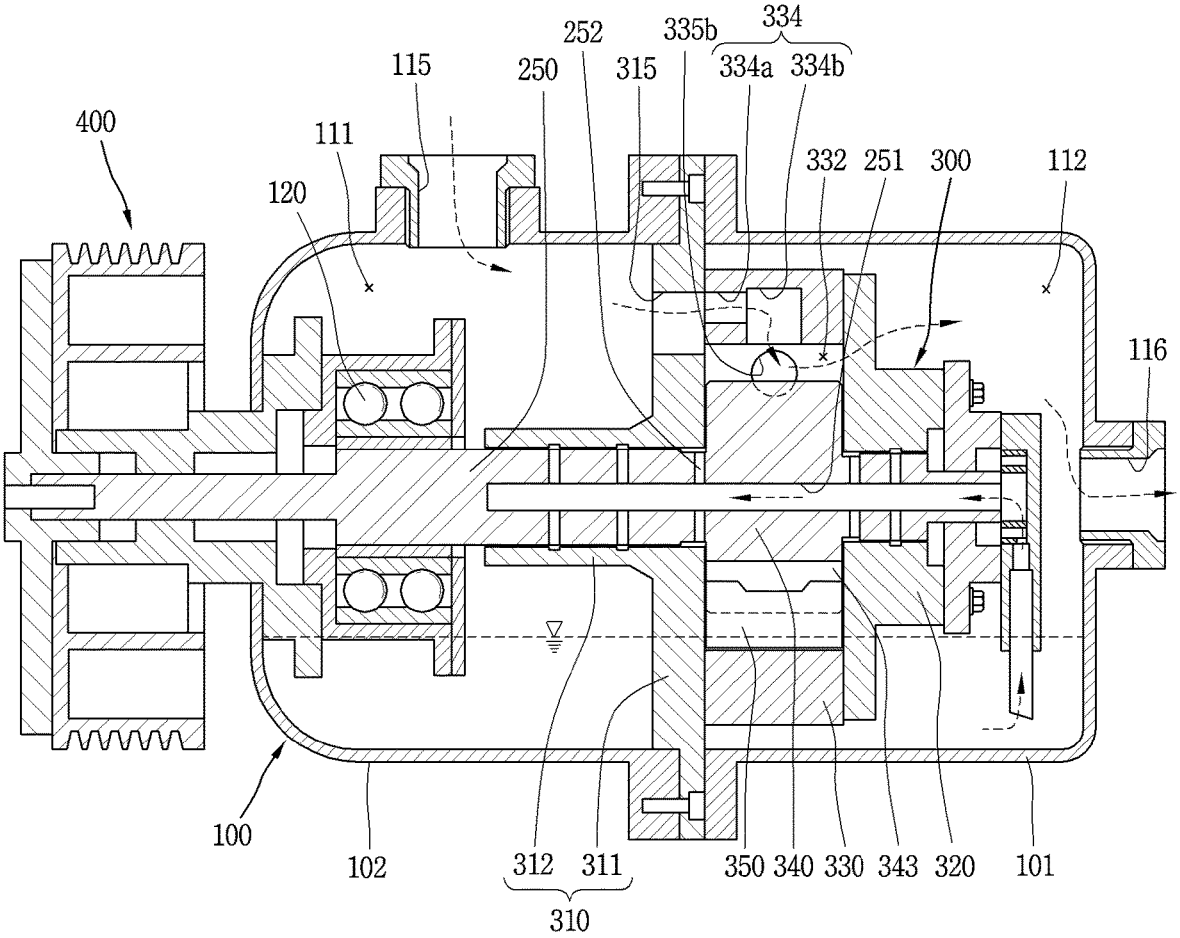
FIG. 1 is a longitudinal cross-sectional view illustrating a transverse open type vane rotary compressor according to the present disclosure.
Figure 2:
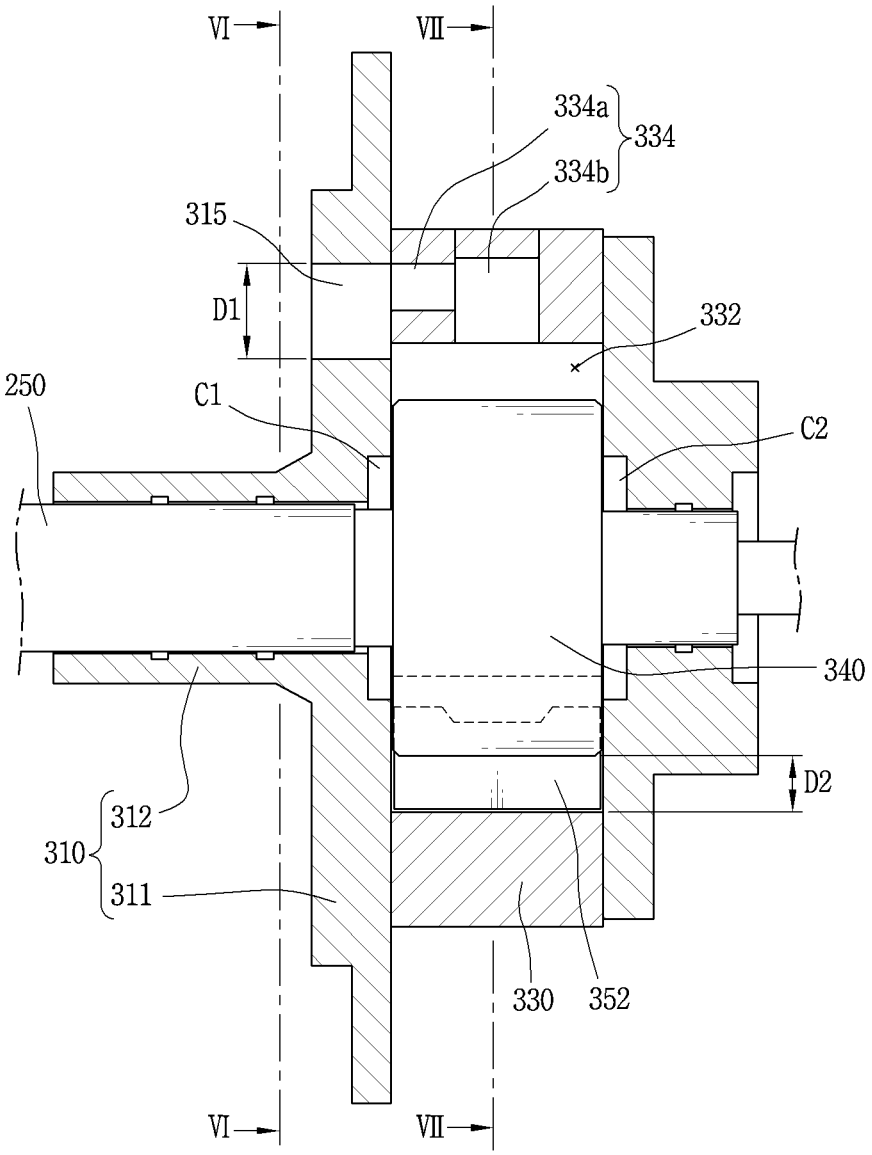
FIG. 2 is an enlarged longitudinal cross-sectional view illustrating the compression unit in FIG. 1.

FIG. 1 is a longitudinal cross-sectional view illustrating a transverse open type vane rotary compressor according to the present disclosure, and FIG. 2 is an enlarged longitudinal cross-sectional view illustrating the compression unit in FIG. 1.

As illustrated in FIG. 1, in a transverse vane rotary compressor according to the present disclosure, an electric motor unit (not shown) is provided outside a casing 100, and a compression unit 300 that receives a rotational force of the electric motor unit by a rotation shaft 250 which will be described later to compress refrigerant is provided inside the casing 100.

The casing 100 is composed of a front shell 101 and a rear shell 102, and a main bearing 310 which will be described later is inserted between the front shell 101 and the rear shell 102 to be fastened with bolts. Accordingly, an inner space of the casing 100 may be divided into two spaces with respect to the main bearing 310, and a suction space 111 and a discharge space 112 may be formed on the rear side and the front side, respectively.

In addition, a front end (right side in the drawing) of the rotation shaft 250 passes through the rear shell 102 of the casing 100 from an outside of the casing 100, and an end portion thereof that has passed through the rear shell 102 of the casing 100 extends toward the front shell 101 of the casing 100. As a result, one end portion of the rotation shaft 250 is positioned outside the casing 100, and the other end portion thereof is positioned inside the casing 100.

Furthermore, one end (hereinafter, front end) of the rotation shaft 250 may be coupled to a magnetic clutch 400 from an outside of the casing 100, and the other end (hereinafter, rear end) of the rotation shaft 250 may be coupled to a roller 340 which will be described later in an inner space of the casing 100.

Furthermore, a front side of the rotation shaft 250 may be rotatably supported by a ball bearing 120 provided in the inner space of the casing 100 while a rear side of the rotation shaft 250 is rotatably supported by the main bearing 310 and the sub-bearing 320 constituting the compression unit 300. Furthermore, the roller 340 is integrally formed or coupled to the other end of the rotation shaft 250 such that the roller 340 can be rotatably coupled to a cylinder 330.

Furthermore, a first oil passage 251 is formed along an axial direction at a center portion of the rotation shaft 250, and a second oil passage 252 passing through thereof in a radial direction is formed at the center of first oil passage 251. As a result, a part of oil moving along the first oil passage 251 may move along the second oil passage 252 and flow into a back pressure hole 343.

The compression unit 300 includes a main bearing 310 (hereinafter, first bearing), a sub-bearing 320 (hereinafter, second bearing), and a cylinder 330 provided between the first bearing 310 and the second bearing 320 to form a compression space 332.

The first bearing 310 may be shrink-fitted or fixedly welded to an inner circumferential surface of the casing 100. However, in order to divide the inner space of the casing 100 into the suction space 111 and the discharge space 112, a sealing member may be provided on an outer circumferential surface of the first bearing 310 and bolt-fastened between the front shell 101 and the rear shell 102. Furthermore, the cylinder 330 and the second bearing 320 may be sequentially adhered to one side (rear surface) of the first bearing 310 and then fastened with bolts.

Here, the first bearing 310 includes a first plate portion 311 for covering a side surface of the cylinder 330 and a shaft receiving portion 312 protruded from a central portion of the first plate portion 311 to support the rotation shaft 250.

An outer diameter of the first plate portion 311 may be formed to be larger than an inner diameter of the casing 100 as the first plate portion 311 is fastened to the casing 100 with bolts. However, although not shown in the drawings, an outer circumferential surface of the first plate portion 311 may be shrink-fitted or fixedly welded to an inner circumferential surface of the casing 100. In this case, an outer diameter of the first plate portion 311 may be equal to or slightly larger than the inner diameter of the casing 100.

Here, a suction passage 315 is passed through one side edge of the first plate portion 311 in an axial direction. The suction passage 315 may be formed to communicate between the suction space 111 of the casing 100 and a suction port 334 which will be described later.

As illustrated in FIG. 2, the suction passage 315 may be formed in such a manner that a radial width (D1) thereof is larger than a maximum radial length (D2) of a compression space 333, that is, a maximum gap between an inner circumferential surface of the cylinder 330 and an outer circumferential surface of the roller 340 at the least.

Furthermore, the outer diameters of the cylinders 330 and the second bearings 320 may be respectively smaller than that of the first bearing 310. Accordingly, as described above, an inner space of the casing 100 is divided into both spaces by the first plate portion 311 of the first bearing 310, and the one space forms the suction space 111 communicating with the suction pipe 115 while the other space forms the discharge space 112 communicating with the discharge pipe 116. Although not shown in the drawing, the second bearing 320 is fixedly pressed, welded, or fastened to an inner circumferential surface of the casing 100, and the cylinder 330 and the first bearing 310 may be sequentially adhered to one side of the second bearing 320 and fastened thereto with bolts.

The suction passage 315 is formed in the first plate portion 311 to pass therethrough in an axial direction so as to communicate with the suction port 334 of the cylinder 330 which will be described later. As a result, as the suction passage 315 is formed out of a range of the compression space 333 of the cylinder 330 which will be described later in a planar projection, an area of the suction passage 315 may be formed to be larger than a gap between the cylinder 330 and the roller 340.

Figure 3:
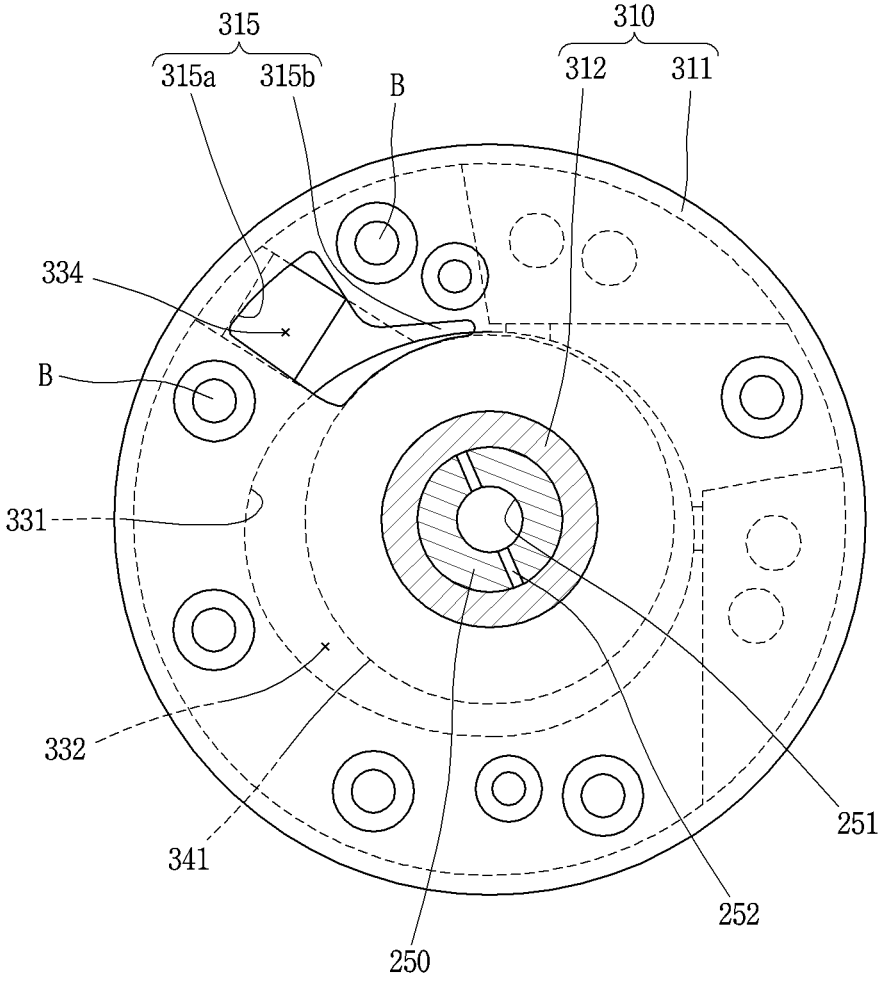
FIG. 3 is a line cross-sectional view taken along line "VI-VI" in FIG. 2.
Figure 4:
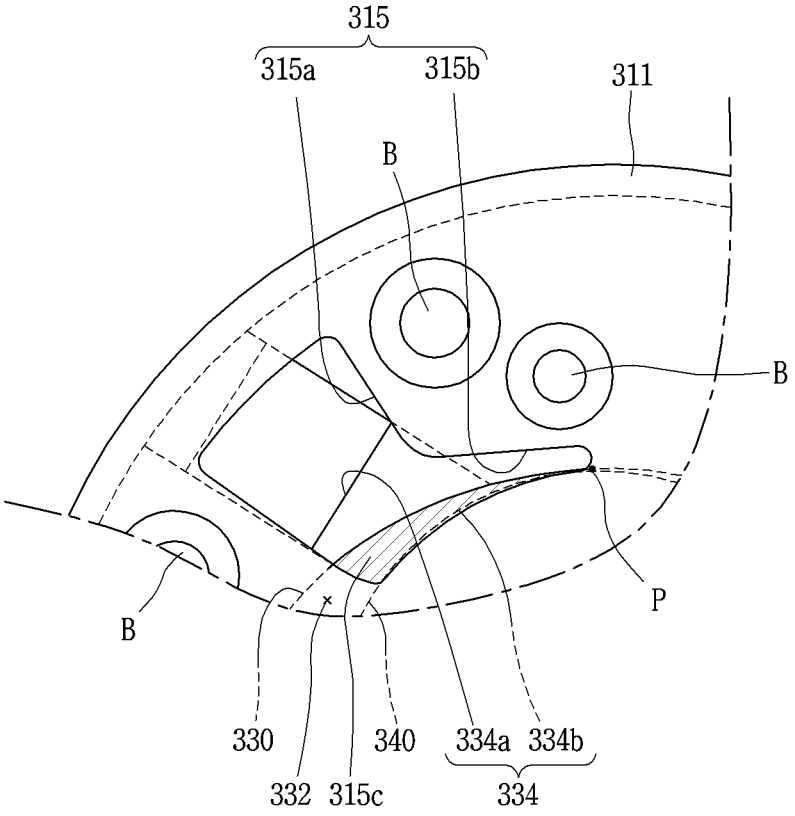
FIG. 4 is an enlarged plan view illustrating a suction passage in FIG. 3.

On the other hand, as illustrated in FIGS. 3 and 4, the suction passage 315 may be formed in various shapes such as a substantially rectangular cross section or a circular cross section. However, when the first bearing 310, the cylinder 330, and the second bearing 320 are fastened with the bolts (B), the fastening positions of the bolts (B) should be taken into consideration, and may be preferably formed in a shape suitable for pulling the suction start angle forward as much as possible.

For example, when the bolts (B) are located around the suction passage (or suction port) 315, they may be formed in an irregular shape by avoiding the fastening positions of the bolts (B). In this case, the suction passage 315 may include a main passage portion 315a and a sub-passage portion 315b. The main passage portion 315a may be formed in a substantially rectangular cross-sectional shape at a relatively large clearance area portion to avoid the bolt positions, and the sub-passage portion 315b may be formed in an elongated rectangular cross-sectional shape in a circumferential direction toward a contact point P which will be described later in the main passage portion 315a. As a result, the suction passage 315 may be positioned adjacent to a contact point (P) while securing a large area of the suction passage (the same applies to the suction port) 315 to move the suction start point in a direction of the contact point, thereby improving the compression performance while quickly performing a suction start.

In addition, the suction passage 315 may be formed with an open passage portion (hatched portion) 315c through which a part of the suction passage 315 can communicate with the compression space 332 as shown in FIG. 4. The open passage portion 315c is formed on an inner circumferential surface portion of the main passage portion 315a and the sub-passage portion 315b, and formed at a position that can overlap with the compression space 332 in an axial direction projection. Of course, the suction passage 315 may be formed to exclude the open passage portion 315c and prevent an inner circumferential surface of the suction passage 315 from deviating from a range of the cylinder 330 in an axial projection, i.e., out of the range of the compression space 332.

Meanwhile, an inner circumferential surface of the cylinder 330 according to the present embodiment is formed in an elliptical shape other than a circular shape. The cylinder 330 may be formed in a symmetrical elliptical shape having a pair of long and short axes. However, the cylinder 330 may be formed in an asymmetric elliptical shape having multiple pairs of long and short axes. Such an asymmetric elliptical cylinder is generally referred to as a hybrid cylinder, and the present embodiment relates to a vane rotary compressor to which a hybrid cylinder is applied.

Figure 5:
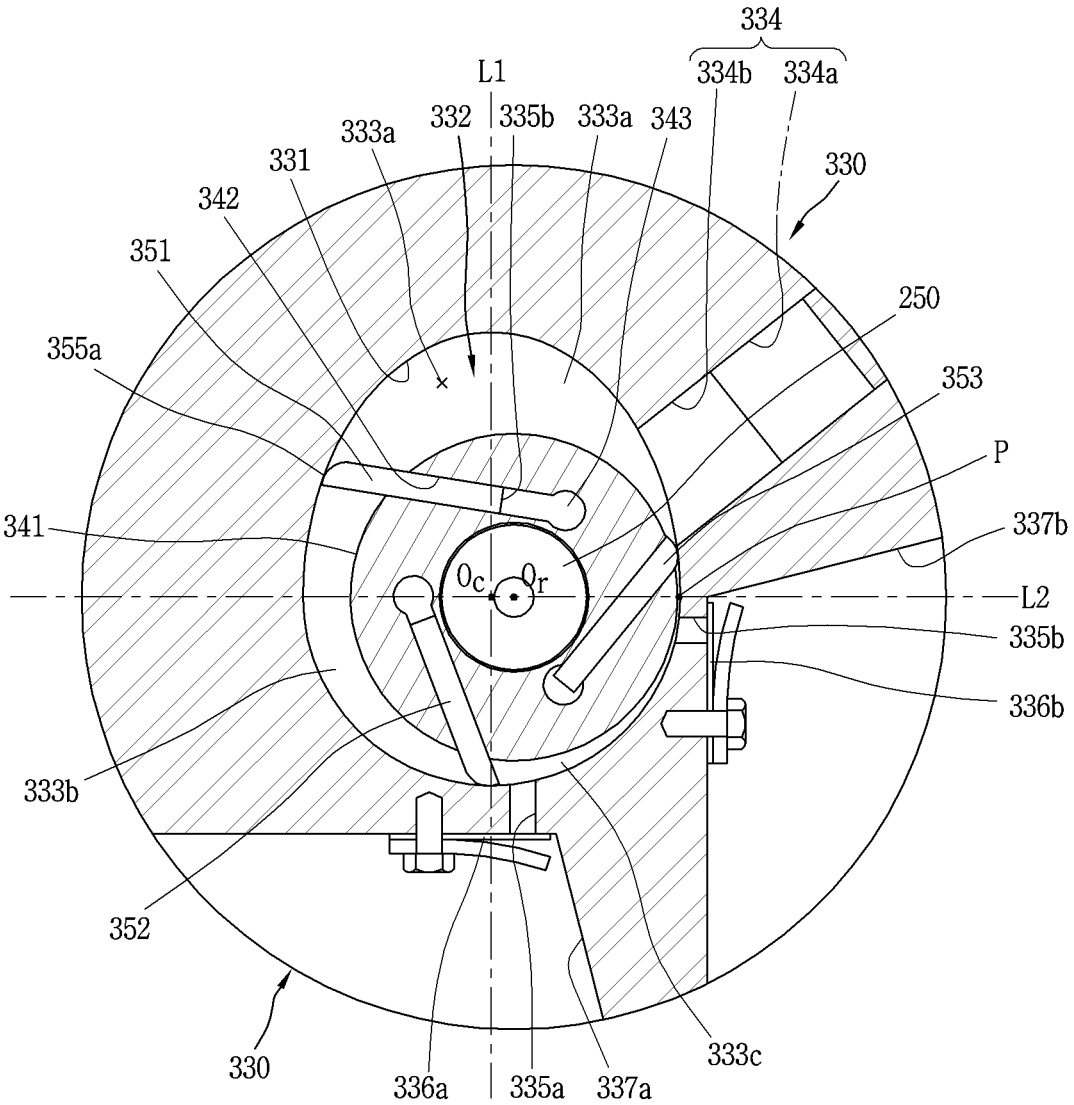
FIG. 5 is a line cross-sectional view taken along line "VII-VII" in FIG. 2.

As illustrated in FIG. 5, the outer circumferential surface of the cylinder 330 according to the present embodiment may be formed in a circular or non-circular shape. In other words, the outer circumferential surface of the cylinder 330 may have any shape as long as the suction port 334 communicating with the suction passage 315 of the first bearing 310 can be formed. Of course, it may be preferable that the first bearing 310 or the second bearing 320 are fixed to an inner circumferential surface of the casing 100, and the cylinder 330 is fastened to the bearing fixed to the casing 100 with bolts to suppress the deformation of the cylinder 330.

In addition, a hollow space portion is formed at a central portion of the cylinder 330 to form the compression space 332 including the inner circumferential surface 331. The hollow space portion is sealed by the first bearing (more precisely, an intermediate plate which will be described later) 310 and the second bearing 320 to form a compression space 332. The roller 340 which will be described later is rotatably coupled to the compression space 332, and a plurality of vanes 350 are provided in a withdrawable manner in the roller 340 such that the plurality of vanes 350 can be moved in a direction of the outer circumferential surface.

The inner circumferential surface 331 of the cylinder 330 constituting the compression space 332 may be formed of a plurality of circles. For example, when a line passing through a point (hereinafter, contact point) (P) where an inner circumferential surface 331 of the cylinder 330 and an outer circumferential surface 341 of the roller 340 are substantially in contact with each other and a center (Oc) of the cylinder 330 is referred to as a first center line (L1), one side (upper side in the drawing) may be formed in an oval shape and the other side (lower side in the drawing) in a circular shape with respect to the first center line (L1).

Furthermore, when a line perpendicular to the first center line (L1) and passing through the center (Oc) of the cylinder 330 is referred to as a second center line (L2), the inner circumferential surface 331 of the cylinder 330 may be formed to be symmetrical to each other with respect to the second center line (L2). Of course, the right and left sides may be formed asymmetrically with respect to each other.

In addition, the suction port 334 is formed on one side of the inner circumferential surface 331 of the cylinder 330, and discharge ports 335a, 335b are formed on the other side thereof in a circumferential direction about a point where the inner circumferential surface 331 of the cylinder 330 and the outer circumferential surface 341 of the roller 340 are substantially in contact with each other.

The suction port 334 may be formed to pass through an inside of the cylinder 330. For example, the suction port 334 may include a first suction port 334a communicating with the suction passage 315 of the first bearing 310 and a second suction port 334b communicating with the first suction port 334a such that the other end thereof is communicated with the compression space 332.

Figure 6:
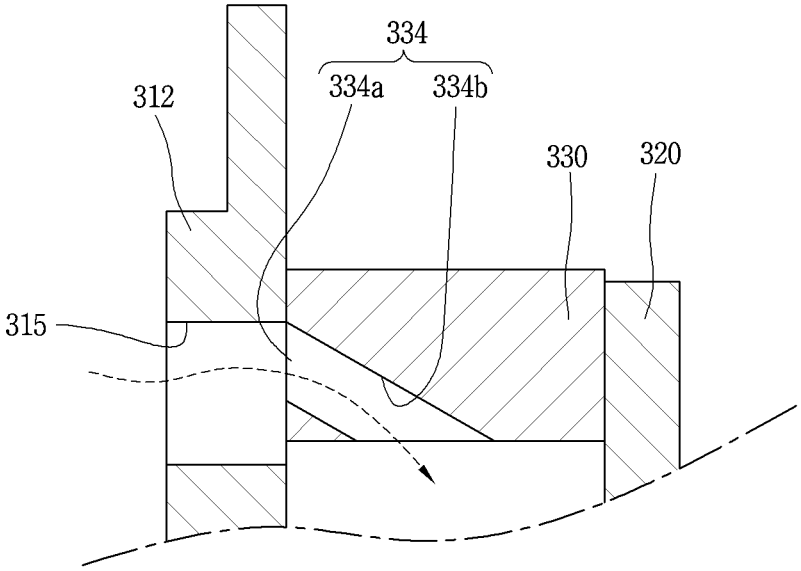
FIGS. 6 and 7 are cross-sectional views illustrating another embodiment of a suction passage and a suction port in FIG. 2.

The first suction portion 334a is formed in an axial direction, and the second suction portion 334b is formed in a radial direction, and as a result, the suction port 334 may be formed in an L-shaped cross section in a front projection. However, the suction port 334 may be formed in such a manner that the first suction port 334a and the second suction port 334b are formed in the same direction, namely, in an inclined direction, as shown in FIG. 6, according to circumstances.

Figure 7:
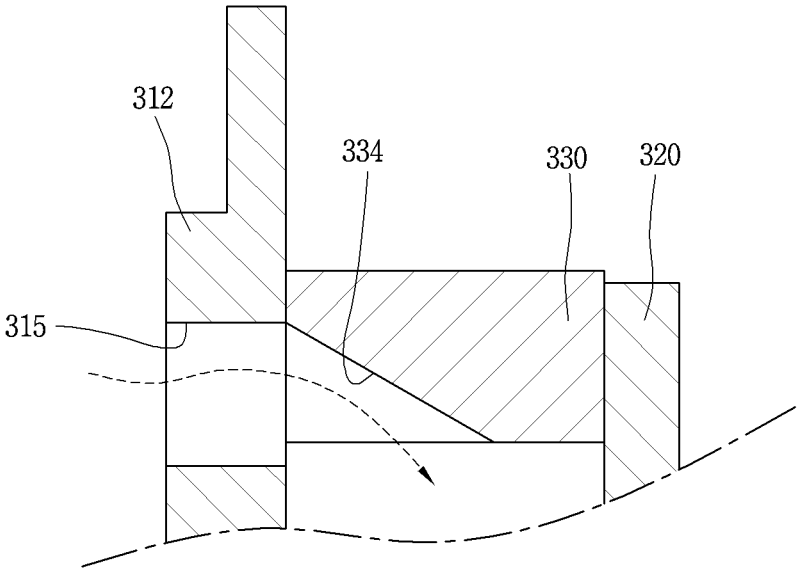

In addition, the suction port 334 may be formed by chamfering an edge of the cylinder, according to circumstances. For example, as shown in FIG. 7, an edge of a portion corresponding to the suction passage 315 may be chamfered from an inner edge in contact with the first bearing 310 on both axial edges constituting an inner circumferential surface of the cylinder 330 to form the suction port 334.

In this case, the suction port 334 may be formed in an L-shape in which the first suction portion 334a and the second suction portion 334b are in the axial direction and the radial direction, respectively, as in the embodiment of FIG. 2, or may be formed in an inclined shape as described above.

In addition, the suction port 334 may be formed to have as large a cross-sectional area as possible so as to minimize suction loss. Accordingly, the suction port 334 may be formed in a shape corresponding to the suction passage 315.

On the other hand, the discharge ports 335a, 335b are indirectly connected to the discharge pipe 116 communicated with the inner space 110 of the casing 100 and coupled to the casing 100 through the discharge ports 335a, 335b. Accordingly, compressed refrigerant is discharged into the inner space 110 of the casing 100 through the discharge ports 335a, 335b, and discharged to the discharge pipe 116. Accordingly, the inner space 110 of the casing 100 maintains a high pressure state that forms the discharge pressure.

Besides, the discharge ports 335a, 335b are provided with discharge valves 336a, 336b for opening and closing the discharge ports 335a, 335b. The discharge valves 336a, 336b may be formed with a reed type valve having one end fixed and the other end constituting a free end. However, the discharge valves 336a, 336b may be applied in various ways as the need arises, such as a piston valve, in addition to the reed type valve.

Moreover, when the discharge valves 336a, 336b are configured with reed type valves, valve grooves 337a, 337b are formed on an outer circumferential surface of the cylinder 330 to mount the discharge valves 336a, 336b. Accordingly, a length of the discharge ports 335a, 335b may be reduced to a minimum to reduce a dead volume. The valve grooves 337a, 337b may be formed in a triangular shape to secure a flat valve seat surface as shown in FIG. [9] *5*.

On the other hand, a plurality of discharge ports 335a, 33b are formed along a compression path (compression advancing direction). For the sake of convenience, between the plurality of discharge ports 335a, 335b, a discharge port positioned on the upstream side with respect to the compression path is referred to as a sub-discharge port (or a first discharge port) 335a, and a discharge port positioned on the downstream side as a main discharge port (or a second discharge port) 335b.

However, the sub-discharge port is not necessarily required, but may be selectively formed as the need arises. For example, when the inner circumferential surface 331 of the cylinder 330 has a longer compression period as will be described later to appropriately reduce the over-compression of refrigerant as described in the present embodiment, the sub-discharge port may not be formed. However, in order to minimize the over-compression amount of the compressed refrigerant, the sub-discharge port 335a as in the related art may be formed on a front side of the main discharge port 335b, that is, on an upstream side, compared to the main discharge port 335b with respect to the compression advancing direction.

Meanwhile, the foregoing roller 340 is rotatably provided in the compression space 332 of the cylinder 330. The outer circumferential surface of the roller 340 is formed in a circular shape, and the rotation shaft 250 is integrally coupled to the center of the roller 340. As a result, the roller 340 has a center corresponding to an axial center of the rotation shaft 250, and rotates together with the rotation shaft 250 about the center (Or) of the roller.

Moreover, the center (Or) of the roller 340 is eccentric with respect to the center (Oc) of the cylinder 33, that is, the center of the inner space of the cylinder 330 such that one side of the outer circumferential surface 341 of the roller 340 is substantially in contact with the inner circumferential surface 341 of the cylinder 330. Here, when a point of the cylinder 330 substantially in contact with the roller 340 is referred to as a contact point (P), the contact point (P) may be a position where the first center line (L1) passing through the center of the cylinder 330 corresponds to a short axis of an elliptic curve constituting the inner circumferential surface 331 of the cylinder 330.

Furthermore, the roller 340 has a vane slot 342 formed at appropriate positions along a circumferential direction on the outer circumferential surface 341 and a back pressure hole 343 configured to allow oil (or refrigerant) to flow thereinto to press each vane 351, 352, 353 in the direction of the inner circumferential surface of the cylinder 330 at an inner end of each vane slot 342.

Upper and lower back pressure chambers (C1, C2) may be respectively formed on upper and lower sides of the back pressure hole 343 to supply oil to the back pressure hole 343.

The back pressure chambers (C1, C2) are formed by the upper and lower sides of the roller 340 and the corresponding outer circumferential surfaces of the first and second bearings 310, 320 and the rotation shaft 250, respectively.

Furthermore, the back pressure chambers (C1, C2) may independently communicate with the second oil passage 252 of the rotation shaft 250, respectively, but a plurality of back pressure holes 343 may be formed together to communicate with the second oil passage 252 through one back pressure chamber (C1, C2).

When a vane closest to the contact point (P) with respect to the compression advancing direction is referred to as a first vane 351, and subsequently referred to as a second vane 352 and a third vane 353, respectively, the vanes 351, 352, 353 are spaced apart from each other by the same circumferential angle between the first vane 351 and the second vane 351, between the second vane 352 and the third vane 353, and between the third vane 353 and the first vane 351.

Therefore, when the compression chamber formed by the first vane 351 and the second vane 352 is referred to as a first compression chamber 333a, the compression chamber formed by the second vane 352 and the third vane 353 as a second compression chamber 333b, and the compression chamber formed by the third vane 353 and the first vane 351 as a third compression chamber 333c, all the compression chambers 333a, 333b, 333c have the same volume at the same crank angle.

The vanes 351, 352, 353 are formed in a substantially rectangular parallelepiped shape. Here, between both lengthwise ends of the vane, a surface of the vane facing the inner circumferential surface 331 of the cylinder 330 is referred to as a sealing surface 355a of the vane, and a surface opposite to the back pressure hole 343 is referred to as a back pressure surface 355b.

The sealing surface 355a of the vanes 351, 352, 353 may be formed in a curved shape to be in line contact with the inner circumferential surface 331 of the cylinder 330, and the back pressure surface 355b of the vanes 351, 352, 353 may be formed to be flat to be inserted into the back pressure hole 343 so as to receive a back pressure evenly.

In the transverse open type vane rotary compressor provided with a hybrid cylinder as described above, when power is applied to an electric motor unit (not shown) provided outside the casing 100 and the electric motor unit is driven, a rotational force of the electric motor unit is transmitted to the rotation shaft 250 by the magnetic clutch 400 coupled to the electric motor unit through a drive pulley, and the rotational force is transmitted to the roller 340 through the rotation shaft 250 to rotate the roller 340 together with the rotation shaft 250.

Then, the vanes 351, 352, 353 are drawn out from the roller 340 by a centrifugal force generated by the rotation of the roller 340 and a back pressure formed on the first back pressure surface 355b of the vanes 351, 352, 353 to allow the sealing surface 355b of the vanes 351, 352, 353 to be brought into contact with the inner circumferential surface 331 of the cylinder 330.

Then, the compression space 332 of the cylinder 330 forms the compression chambers 333a, 333b, 333c as many as the number of the vanes 351,352, 353 by the plurality of vanes 351,352, 353, and each of the compression chambers 333a, 333b, 333c varies in volume by the shape of the inner circumferential surface 331 of the cylinder 330 and the eccentricity of the roller 340 while moving along the rotation of the roller 340, and refrigerant filled into each of the compression chambers 333a, 333b, 333c repeats a series of processes of sucking, compressing and discharging the refrigerant while moving along the roller 340 and the vanes 351, 352, 353.

It will be described in more detail as follows.

In other words, when the compression unit 300 is operated by the electric motor unit, the refrigerant is sucked into the suction space 111 of the casing 100 through the suction pipe 115, and when based on the first compression chamber 333a, a volume of the first compression chamber 333a is continuously increased until the first vane 351 passes through the suction port 334 and the second vane 352 reaches the suction completion point to allow the refrigerant to continuously flow into the first compression chamber 333a through the suction passage 315 and the suction port 334.

Next, when the second vane 352 reaches the suction completion point (or compression start angle), the first compression chamber 333a will be in a sealing state to move together with the roller 340 in a discharge port direction. During the process, while the volume of the first compression chamber 333a is continuously reduced, the refrigerant in the first compression chamber 333a is gradually compressed.

Next, in a state where the first vane 351 passes through the first discharge port 335a and the second vane 352 does not reach the first discharge port 335a, the first discharge valve 336a is open by a pressure of the first compression chamber 333a while the first compression chamber 333a is communicated with the first discharge port 335a. Then, a part of the refrigerant in the first compression chamber 333a is discharged into the discharge space 112 of the casing 100 through the first discharge port 335a to reduce the pressure of the first compression chamber 333a to a predetermined pressure. Of course, in the absence of the first discharge port 335a, the refrigerant of the first compression chamber 333a is further moved toward the second discharge port 335b, which is a main discharge port, without being discharged.

Next, when the first vane 351 passes through the second discharge port 335b and the second vane 352 reaches the discharge start angle, the refrigerant of the first compression chamber 333a is discharged into the discharge space 112 of the casing 100 through the second discharge port 336b while the second discharge valve 336b is open by the pressure of the first compression chamber 333a.

The above-described series of processes are similarly repeated in the second compression chamber 333b between the second vane 352 and the third vane 353, and in the third compression chamber 333c between the third vane 353 and the first vane 351, and the vane rotary compressor according to the present embodiment performs three discharges per revolution (six discharges including discharge from the first discharge port) in the roller 340.

On the other hand, in case of a low pressure type in which the suction pipe communicates with the inner space of the casing as in the present embodiment, when the suction passage 315 is formed in the first bearing 310 and the suction port 334 is formed on the inner circumferential surface 331 of the cylinder 330, an area of the suction flow path through which the refrigerant is sucked into the compression chamber 332 may be maximized, thereby preventing suction loss.

In other words, in the related art, as the suction port is formed in the first bearing, an area of the suction port is greatly affected by a gap between an inner circumferential surface of the cylinder and an outer circumferential surface of the roller. As a result, as described above, there is a limit in increasing the area of the suction port, and there has been a limitation in the compression performance due to the suction loss.

However, when the suction port 334 corresponding to an outlet of the suction flow path is formed on the inner circumferential surface 331 of the cylinder 330 as in this embodiment, an area of the suction port 334 is not affected by a gap between the inner circumferential surface 331 of the cylinder 330 and the outer circumferential surface 341 of the roller 340 but affected by a height of the cylinder 330. Therefore, it may be possible to maximize the area of the suction port 334, namely, within a range that is smaller than the height of the cylinder 330 (of course, the sealing area should be taken into consideration). Accordingly, the area of the suction passage 315 corresponding to the inlet of the suction flow path and formed in the first bearing 310 may not be affected by a gap between the inner circumferential surface 331 of the cylinder 330 and the outer circumferential surface 341 of the roller 340, and thus enlarged as much as the area of the suction port 334. Therefore, the area of the suction flow path may be maximized to improve the performance of the compressor while reducing the suction loss.

Meanwhile, when the suction pipe 115 communicates with the inner space of the casing 100 as in the present embodiment, the refrigerant sucked into an inner space of the casing 100 through the suction pipe 115 circulates the inner space of the casing 100, (i.e., suction space) 111, and then is guided to the suction passage 315. Therefore, the flow path loss to the refrigerant is generated, which causes the performance of the compressor to deteriorate.

Figure 8:
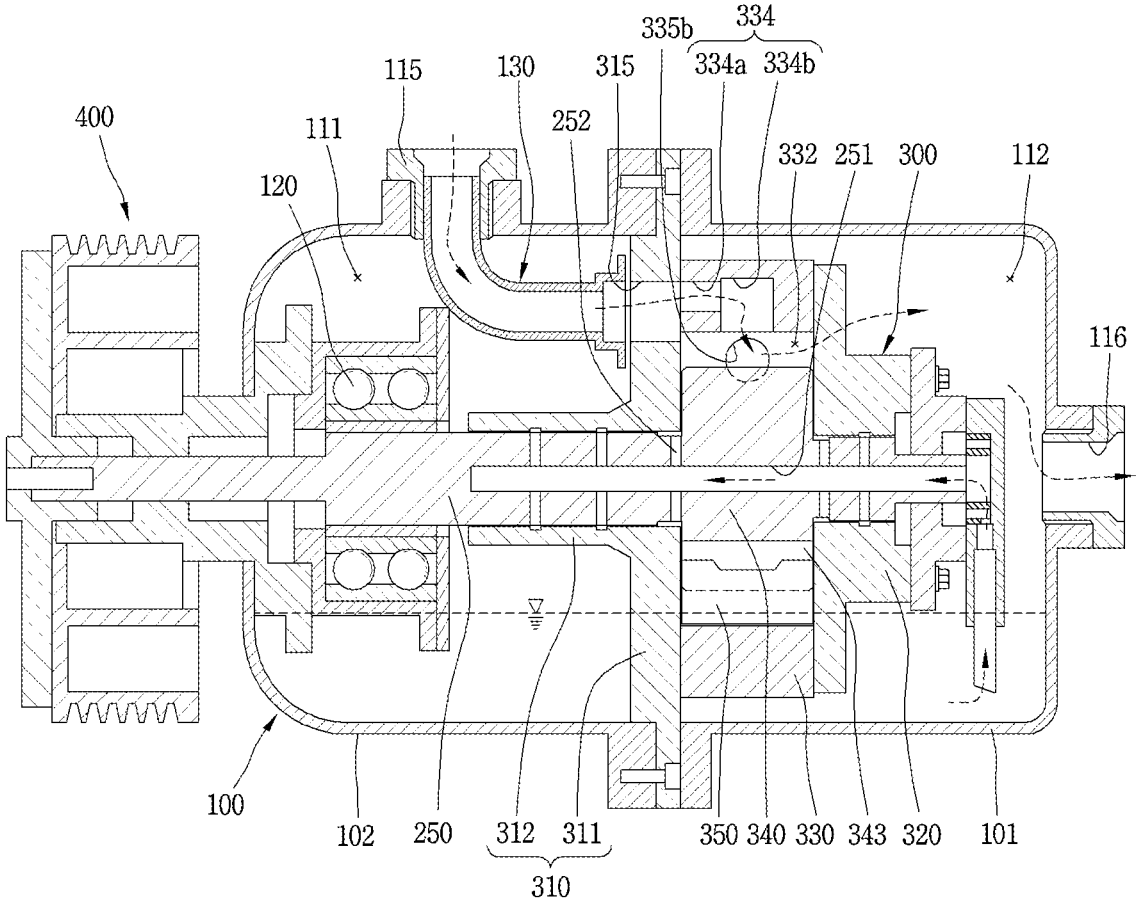
FIG. 8 is a longitudinal cross-sectional view illustrating an example in which a suction guide pipe is applied in the vane rotary compressor according to FIG. 1.
Figure 9A:
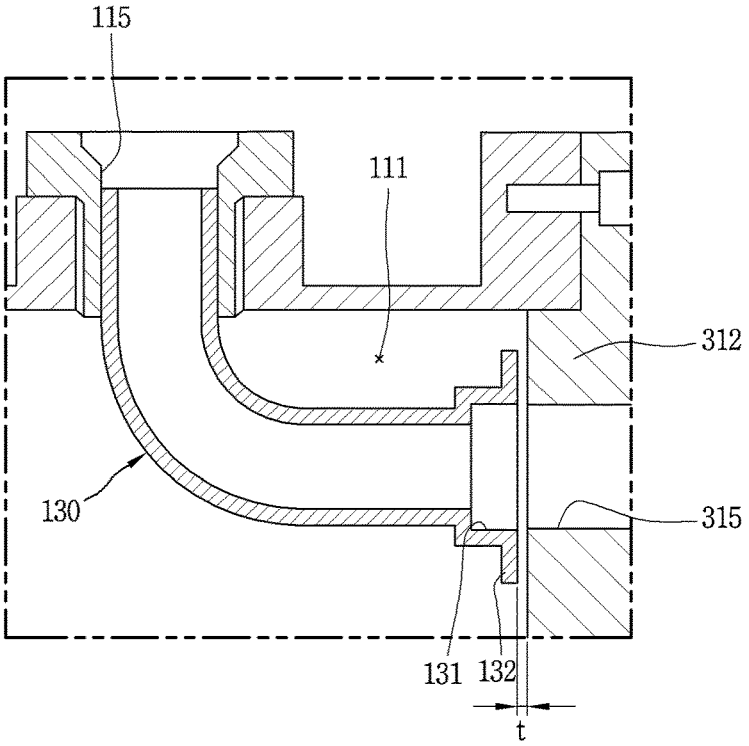
FIGS. 9A and 9B are enlarged views illustrating an embodiment in which the suction guide pipe is coupled thereto in FIG. 8.
Figure 9B:
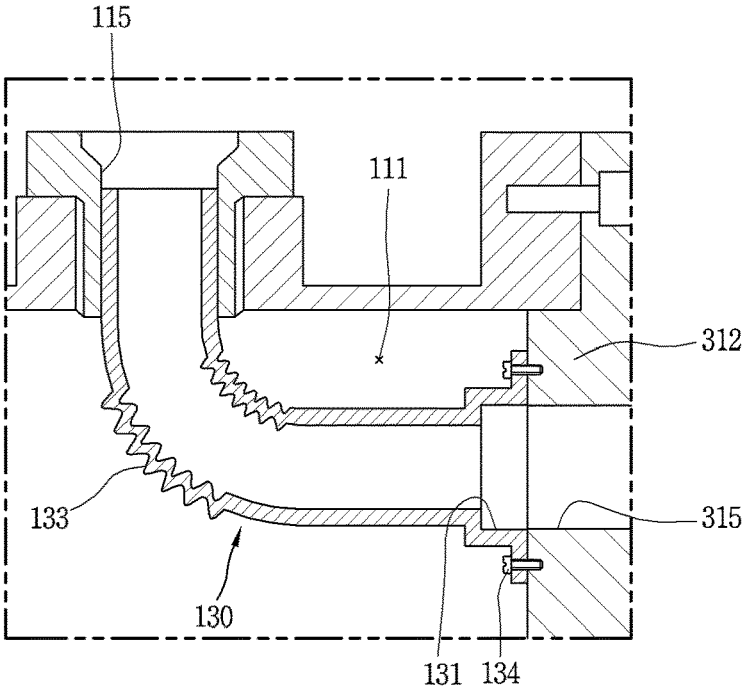

As a result, as shown in FIGS. 8 through 9B, in the present embodiment, a suction guide pipe 130 may be installed between an outlet of the suction pipe 115 communicating with the inner space of the casing 100 and the suction passage 315. However, in this case, when one end of the suction guide pipe 130 is fixedly coupled to the outlet of the suction pipe 115, the other end of the suction guide pipe 130 on the opposite side may be fixed to the first bearing 310 or the second bearing 320 formed with the suction passage 315 or preferably installed to be slightly separated therefrom. Of course, the opposite is also possible.

This is because when the both ends of the suction guide pipe 130 are fixedly connected to the suction pipe 115 and the suction passage (or first or second bearing) 315, respectively, the suction guide pipe 130 may be damaged by the vibration of the compressor caused by the outside or inside of the compressor casing 100. Therefore, it may be preferably that at least one of the both ends of the suction guide pipe 130 is slightly spaced from the corresponding member in terms of reliability. For reference, FIG. 9A is a view showing an example in which the suction guide pipe 130 is spaced apart from the suction passage 315 of the first bearing 310 by a predetermined distance (t). However, even in this case, it is preferable that the end being spaced apart is arranged so that the end thereof can receive the suction pipe 115 or the suction passage 315 corresponding thereto.

Furthermore, the suction guide pipe may be formed with an expansion portion 131 and a sealing portion 132 at an end spaced apart from the suction passage. For the expansion portion, when an inner diameter (or cross-sectional area) of the suction passage 315 is larger than that of the suction guide pipe (or suction pipe) 130, a diameter of the suction guide pipe 130 may be formed to correspond to that of the suction pipe 115 while the expansion portion 131 is formed at an end portion corresponding to the suction passage 315 to smoothly guide the refrigerant to the suction passage 315.

In addition, when an end portion of the suction guide pipe 130 is separated from the suction passage 315 as described above, a part of the refrigerant passing through the suction guide pipe 130 may leak through an open gap (t), and thus a flange-shaped sealing portion 132 may be formed to minimize the leakage of the refrigerant into the gap (t). *For example, a radial width of the flange-shaped sealing portion 132 may be greater than or equal to the gap (t), as shown in FIG. 9A.* As a result, the refrigerant may be smoothly guided to the suction passage.

Furthermore, the both ends of the suction guide pipe 130 may be spaced apart from either one of the suction pipe 115 or the suction passage 315 as described above. However, as shown in FIG. 9B, when an elastic portion 133 is formed in the middle of the suction guide pipe 130, the both ends of the suction guide pipe 130 may be fixedly connected to the suction pipe 115 and the suction passage 315, respectively.

Of course, in this case, the entire suction guide pipe 130 may be formed of a flexible material without having an additional elastic portion 123. In addition, in those cases, either one of the both ends of the suction guide pipe 130 may be spaced apart. Reference numeral 134 in the drawing is a fixed portion.

As described above, in the low-pressure vane rotary compressor in which the suction space 111 of the casing 100 is filled with a suction pressure, when the suction pipe 115 and the suction passage 315 are connected by the suction guide pipe 130, refrigerant sucked through the suction pipe 115 is guided directly to the suction passage 315 along the suction guide pipe 130.

Accordingly, since most of the refrigerant is directly supplied to the compression chamber without passing through the suction space 111 of the casing 100, flow loss may be minimized to further improve the performance of the compressor.

Meanwhile, another embodiment of the rotary compressor according to the present disclosure will be described as follows.

In other words, in the foregoing embodiment, an example is shown in which the electric motor unit is separately provided outside the casing and applied to an open type vane rotary compressor for transmitting electric power to the compression unit provided inside the casing, but the present disclosure may be similarly applicable to a closed type vane rotary compressor provided together with an electric motor unit and a compression unit.

Figure 10:
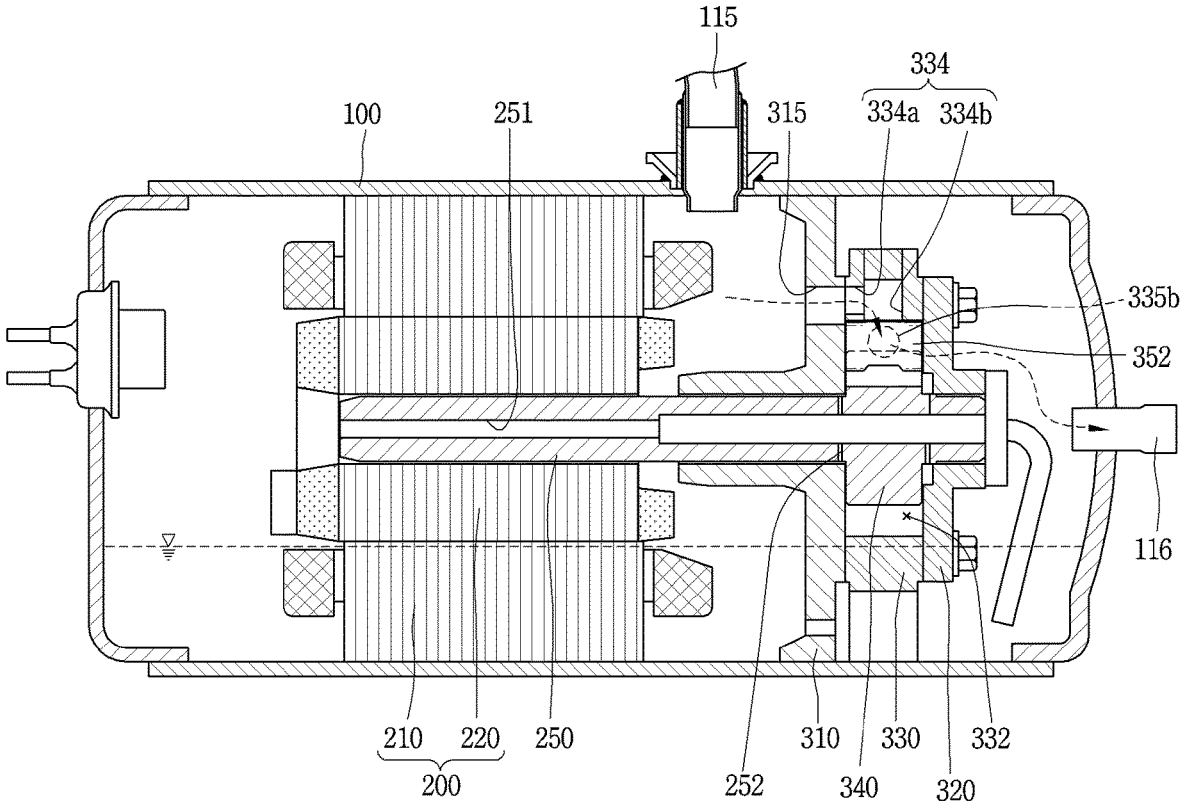
FIGS. 10 and 11 are longitudinal cross-sectional views illustrating a transverse closed type vane rotary compressor according to the present disclosure.

For example, as shown in FIG. 10, in a closed type vane rotary compressor according to the present embodiment includes, an electric motor unit 200 and a compression unit 300 are disposed at a predetermined interval from each other inside the casing 100, and the compression unit 300 is connected to the compression unit 300 through the rotation shaft 250 to transmit a rotational force of the electric motor unit 200 to the compression unit 300.

In this case, the compression unit 300 may be configured in the same manner as the above-described embodiment. In particular, the suction passage 315 is formed in the first bearing 310 forming the main bearing, and the suction port 334 is formed in the cylinder 330, respectively, similarly to the foregoing embodiment. Accordingly, the detailed description thereof will be omitted.

However, in this embodiment, the electric motor unit 200 serves to provide power for compressing refrigerant, and ncludes a stator 210 and a rotor 220.

The stator 210 is fixedly provided inside the casing 100 and may be mounted on an inner circumferential surface of the casing 100 by a method such as shrink-fitting.

The rotor 220 is spaced apart from the stator 210 and located inside the stator 210. The rotation shaft 250 is pressed into the center of the rotor 220, and the roller 340 constituting the compression unit 300 is integrally formed or assembled at an end portion of the rotation shaft 250. Accordingly, when power is applied to the stator 210, a force generated by a magnetic field formed between the stator 210 and the rotor 220 causes the rotor 220 to rotate.

As the rotor 220 rotates, a rotational force of the electric motor unit is transmitted to the compression unit 300 by the rotation shaft 250 coupled to the center of the rotor 220.

As described above, when both the electric motor unit 200 and the compression unit 300 are provided inside the casing 100, the suction passage 315 is formed in the first bearing 310, and the suction port 334 in a side surface of the cylinder 330, respectively. Accordingly, it may be possible to secure a large area of the suction passage 315, thereby reducing suction loss to the minimum Moreover, even in this case, a suction guide pipe (not shown) (refer to FIG. 8) may be provided between the suction pipe 115 and the suction passage 315 to minimize flow loss to the refrigerant being sucked. For reference, in this case, it is easy to install the suction guide pipe that the suction pipe is positioned between the electric motor unit and the compression unit.

Figure 11:
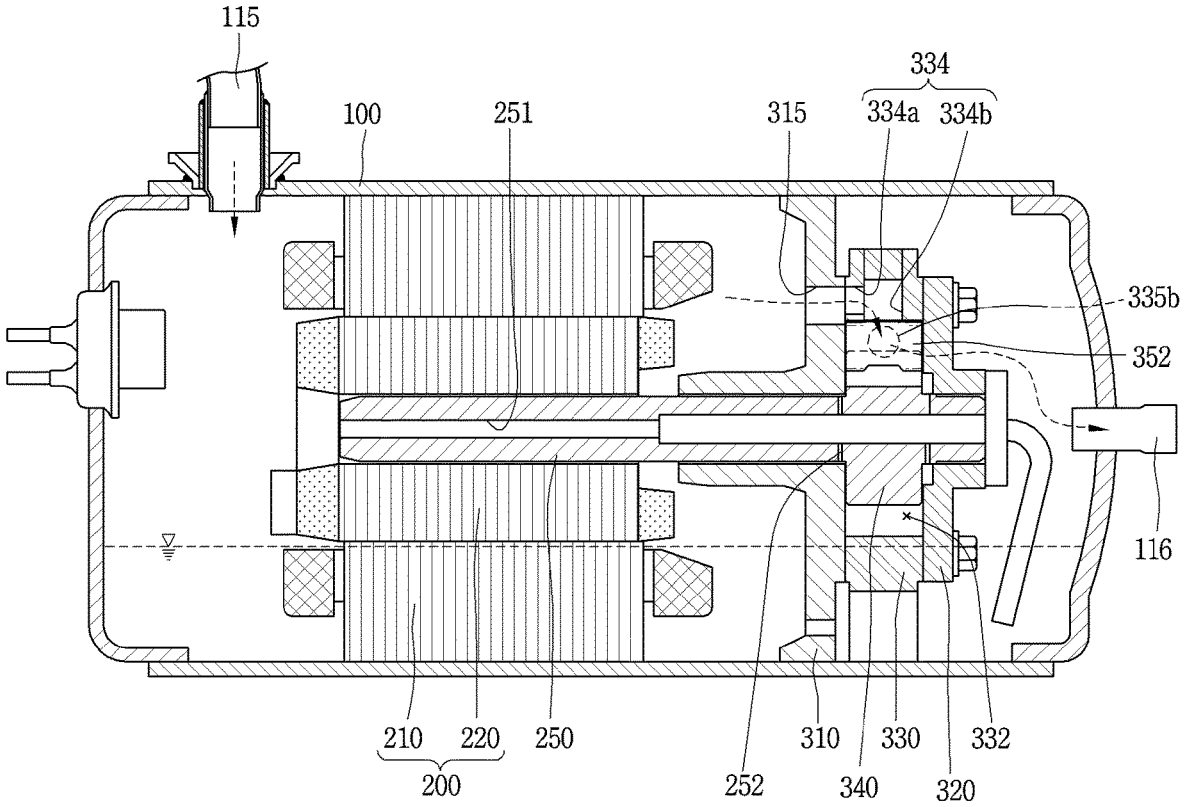

On the other hand, as shown in FIG. 11, in a closed type vane rotary compressor according to the present embodiment, the suction pipe 115 may not be connected between the electric motor unit 200 and the compression unit 300, but connected to one side of the electric motor unit 200, that is, on an opposite side of the compression unit 300 with respect to the electric motor unit 200.

When the suction pipe 115 is installed on the opposite side of the compression unit 300 with the electric motor unit 200 therebetween, the suction passage 315 and the suction ports 334a, 334b may be formed in the same manner as the above-described embodiment. Accordingly, the detailed description thereof will be omitted.

However, as the suction pipe 115 is provided on the opposite side of the compression unit 300 with the electric motor unit 200 therebetween, cold suction refrigerant being sucked through the suction pipe 115 may cool the electronic motor unit 200, thereby enhancing the efficiency of the electric motor unit.

On the other hand, though the present disclosure has been described with reference to an example applied to a transverse type compressor, the same may be applicable to the case of a longitudinal type.

What is claimed is:

1. A rotary compressor, comprising:

a casing that defines an inner space;

a suction pipe that communicates with the inner space of the casing;

a cylinder located in the inner space of the casing and coupled to the casing, the cylinder defining at least a portion of a compression space by an inner circumferential surface of the cylinder;

a first bearing located at an upper side of the cylinder;

a second bearing located at a lower side of the cylinder, the first and second bearings defining the compression space together with the cylinder;

a roller that is located at an eccentric position in the compression space and that is offset toward the inner circumferential surface of the cylinder, the roller being configured to vary a volume of the compression space [based on] *during* rotation of the roller with respect to the cylinder; and a vane that is located in the roller, that is configured to rotate with respect to the cylinder [based on] *during* rotation of the roller, and that is configured to, [based on] *during* rotation of the roller, protrude toward and retract from the inner circumferential surface of the cylinder, the vane partitioning the compression space into a plurality of compression chambers, wherein the first bearing [or the second bearing] defines a suction passage that communicates with the compression space, wherein the cylinder defines a suction port that is located at a side of the cylinder and that enables communication between the suction passage and the compression space, wherein the rotary compressor further comprises a suction guide pipe located between the suction passage and the suction pipe, the suction guide pipe comprising a first end configured to connect to the suction pipe and a second end configured to correspond to the suction passage, and wherein the second end of the suction guide pipe comprises[:

an expansion portion having an inner diameter greater than an inner diameter of the suction passage, and]

a sealing portion that has a flange-shape and extends from an outer circumferential surface of the [expansion portion] *suction guide pipe*.

2. The rotary compressor of claim 1, wherein a radial width of the suction passage is greater than a gap between the inner circumferential surface of the cylinder and an outer circumferential surface of the roller.

3. The rotary compressor of claim 2, wherein the cylinder defines the suction port having a hole that passes through a portion of the cylinder.

4. The rotary compressor of claim 1, wherein the suction passage is located outside of the compression space.

5. The rotary compressor of claim 1, wherein a part of the suction passage is located within the compression space.

6. The rotary compressor of claim 1, further comprising an electric motor that is located outside of the casing and that comprises a stator and a rotor, wherein the electric motor is coupled to the roller and connected to a rotation shaft that passes through the casing.

7. The rotary compressor of claim 1, wherein the suction passage comprises:

a main passage portion; and a sub-passage portion that extends from the main passage portion in a direction opposite to a rotational direction of the roller.

8. The rotary compressor of claim 7, wherein a radial width of the sub-passage portion is less than a radial width of the main passage portion, and wherein a circumferential length of the sub-passage portion is greater than the radial width of the sub-passage portion.

9. The rotary compressor of claim 7, wherein the sub-passage portion is configured to, [based on] *during* rotation of the roller, cause suction of refrigerant through the suction port before the main passage portion causing suction of refrigerant.

*10. The rotary compressor of claim 1, wherein the suction guide pipe further comprises an expansion portion having an inner diameter greater than an inner diameter of the first end of the suction guide pipe, and*

*wherein the sealing portion extends from an outer circumferential surface of the expansion portion.*

*11. The rotary compressor of claim 10, wherein the suction guide pipe is spaced apart from the suction passage by a predetermined distance, and*

*wherein a radial width of the sealing portion is greater than or equal to the predetermined distance between the suction guide pipe and the suction passage.*

*12. The rotary compressor of claim 1, wherein the suction guide pipe further comprises an expansion portion having an inner diameter greater than an inner diameter of the suction passage, and*

*wherein the sealing portion extends from an outer circumferential surface of the expansion portion.*

*13. The rotary compressor of claim 12, wherein the suction guide pipe is spaced apart from the suction passage by a predetermined distance, and*

*wherein a radial width of the sealing portion is greater than or equal to the predetermined distance between the suction guide pipe and the suction passage.*

*14. The rotary compressor of claim 1, wherein the outer circumferential surface of the suction guide pipe is in contact with an inner circumferential surface of the suction pipe at the first end of the suction guide pipe.*

* * * * *